(12) United States Patent
Kang

(10) Patent No.: US 6,212,883 B1
(45) Date of Patent: Apr. 10, 2001

(54) METHOD AND APPARATUS FOR TREATING EXHAUST GAS FROM VEHICLES

(75) Inventor: Han-Yong Kang, Anyang (KR)

(73) Assignee: Moon-Ki Cho, Seoul (KR)

( * ) Notice: Subject to any disclaimer, the term of this patent is extended or adjusted under 35 U.S.C. 154(b) by 0 days.

(21) Appl. No.: 09/518,409

(22) Filed: Mar. 3, 2000

(51) Int. Cl.[7] .................................................. F01N 3/00
(52) U.S. Cl. .............................. 60/275; 60/310; 204/176; 422/186.07
(58) Field of Search .................. 60/274, 275, 310; 204/176; 422/186.07

(56) References Cited

U.S. PATENT DOCUMENTS

| | | | |
|---|---|---|---|
| 3,984,296 | * 10/1976 | Richards | 204/157.1 |
| 4,945,721 | * 8/1990 | Cornwell et al. | 60/275 |
| 5,121,602 | * 6/1992 | McCorvey | 60/310 |
| 5,223,105 | * 6/1993 | Arthurson et al. | 422/186.07 |
| 5,806,305 | * 9/1998 | Miller et al. | 60/285 |
| 5,807,526 | * 9/1998 | Miljevic | 60/275 |
| 5,863,413 | * 1/1999 | Caren et al. | 204/157.5 |
| 6,012,283 | * 1/2000 | Miller et al. | 60/275 |
| 6,033,462 | * 3/2000 | Chu | 60/310 |
| 6,038,853 | * 3/2000 | Penetrante et al. | 60/275 |
| 6,038,854 | * 3/2000 | Penetrannte et al. | 60/275 |
| 6,047,543 | * 4/2000 | Caren et al. | 60/275 |
| 6,048,500 | * 4/2000 | Caren et al. | 422/186.3 |
| 6,153,151 | * 11/2000 | Moxley et al. | 422/186.07 |

FOREIGN PATENT DOCUMENTS

| | | |
|---|---|---|
| 4231581 | * 3/1994 | (DE) . |
| 0070016 | * 4/1983 | (JP) . |
| 63-100919 | 5/1988 | (JP) . |

\* cited by examiner

*Primary Examiner*—Thomas Denion
*Assistant Examiner*—Diem Tran
(74) *Attorney, Agent, or Firm*—Fish & Richardson P.C.

(57) ABSTRACT

A method and apparatus for treating exhaust gas produced from the combustion of fuels is disclosed. Pollutants such as unburnt hydrocarbons, carbon monoxides, oxides of nitrogen and oxides of sulfur are oxidized by ozone in an ozone contractor, and then resolved by water vapor in a muffler, so that they can be reduced.

9 Claims, 1 Drawing Sheet

METHOD AND APPARATUS FOR TREATING EXHAUST GAS FROM VEHICLES

BACKGROUND OF THE INVENTION (a) Field of the Invention

The present invention relates to a method and apparatus for treating exhaust gas produced from the combustion of fuels, and more particularly, to such a method and apparatus wherein the reduction of pollutants is achieved by the use of ozone and water vapor.

(b) Description of the Related Art

Internal combustion engines, which operate by the controlled combustion of hydrocarbon fuels, produce exhaust gases containing the complete combustion products of $CO_2$ and $H_2O$, and also pollutants from incomplete combustion, such as unburnt hydrocarbons (HC) as well as CO, which is a direct poison to human life. Further, due to the very high temperatures produced by the burning of hydrocarbon fuels, thermal fixation of nitrogen from the air results in the detrimental formation of nitric oxides ($NO_x$).

The quantity of pollutants varies with many operating conditions of the engine, but it is influenced predominantly by the air-to-fuel ratio in the combustion chamber. Conditions conducive to reducing carbon monoxide and unburnt hydrocarbons (a fuel mixture just lean of stoichiometric as well as high combustion temperatures) cause an increased formation of $NO_x$, and conditions conducive to reducing the formation of $NO_x$ (rich fuel mixture and low combustion temperatures) cause an increase in carbon monoxide and unburnt hydrocarbons in the exhaust gases of the engine. As a result, within the region of stable operation of the internal combustion engine, a significant amount of CO, HC and $NO_x$ is emitted into the atmosphere.

There has been a proposed three-way catalysis (TWC) technology to reduce the pollutants of the exhaust gases. The TWC technology comprises the use of precious metals Pt, Rh, and Ce. The basic operation of Pt is to oxidize CO and HC to $CO_2$ and $H_2O$, Rh is primarily responsible for the reduction of $NO_x$, and Ce functions as an emitter of oxygen. The activity of Rh, however, is reduced in a high oxidizing atmosphere, and Rh may react with $CeO_2$ at high temperature, reducing the activity of both.

Reduction technology has also proposed the use of ammonia as a reducing agent and $V_2O_5$—$TiO_2$ as a catalyst, but this is likely to exhaust toxic ammonia gas according to the concentration of $NO_x$ in the exhaust gas.

Another reducing agent has been proposed using hydrocarbons instead of ammonia in Japanese Laid-Open Patent Application No. 63-100919. A catalyst is used in combination with copper and a porous carrier such as alumina, silica or zeolite. However, this method has drawbacks in that the catalyst is likely to be degraded by $SO_x$.

SUMMARY OF THE INVENTION

In view of the prior art described above, it is an object of the present invention to provide a method and apparatus for treating exhaust gas produced from the combustion of fuels.

It is another object of the present invention to provide a method and apparatus for reducing pollutants of incomplete combustion in the exhaust gases treated by the use of ozone and water vapor.

A particularly advantageous feature of preferred embodiments of the present invention is that they can be applied to a variety of different types of internal combustion engines, including, but not limited to, automobiles, trucks, stationary power generators, motor boats and motorcycles.

To achieve these and other objects and features, as embodied and broadly described herein, the invention comprises the steps of:

introducing ozone into the exhaust gas in an ozone contactor which is located downstream from a catalytic converter;

passing the exhaust gas through a muffler having an inlet and an outlet;

introducing water vapor into the exhaust gas prior to the outlet of the muffler; and passing the exhaust gas through at least a portion of a muffler, thereby reducing at least one pollutant, selected from the group consisting of unburnt hydrocarbons, carbon monoxide and oxides of nitrogen, from a first concentration to a second lower concentration.

According to another aspect of the present invention, an apparatus for treating exhaust gas produced from the combustion of fuels, comprising:

an ozone contactor located downstream from a catalytic converter, for mixing the exhaust gas with ozone;

a muffler having an inlet and an outlet;

a water evaporator for adding water vapor to the exhaust gas; and a passageway for conducting water vapor into the muffler such that the exhaust gas stream passes through water vapor prior to exhausting from the outlet of the muffler.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION OF THE PREFERRED EMBODIMENTS

The present invention will be described in detail with reference to the accompanying drawings.

Figure 1:
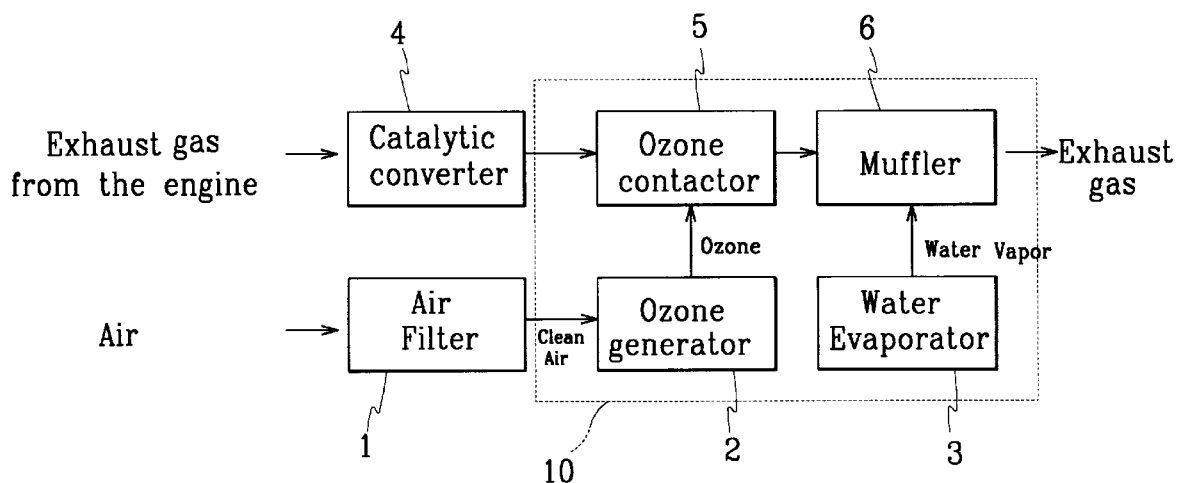
FIG. 1 is a block diagram illustrating an embodiment of the apparatus of the present invention.

Referring to FIG. 1, one embodiment of an apparatus of the present invention is illustrated generally at 10. The apparatus 10 comprises an ozone contactor 5, ozone generator 2, water evaporator 3 and muffler 6. The ozone contactor 5 is located upstream from a muffler 6 and downstream from a catalytic converter 4. The ozone generator 2 provides the ozone contactor with ozone.

The ozone generator 2 can be either of two basic types: ultraviolet or corona discharge. The ultraviolet type employs gas-discharge lamps which emit bright ultraviolet light (also called "UV" or "black light" lamps) which breaks up atmospheric oxygen and thus creates ozone. Because UV lamps are relatively fragile and bulky, requiring a large housing in ultra-violet type ozone generators, corona discharge type generators are preferably used in the embodiment of the present invention.

The ozone generator 2 of the corona discharge type creates ozone by subjecting air, which is provided from an air filter 1, to a very high electric field. The strong electric field sufficient to break up oxygen molecules is supplied from an inverter, which comprises insulated gate bipolar transistors (IGBT) and a transformer having a winding ratio of 1:10. The high-voltage coil of the inverter is connected to two electrodes such that one goes positive when the other is negative. The two electrodes form a sort of capacitor, and usually comprise two parallel plates, concentric cylinders, or some other geometry which allows for a constant distance between the electrodes. The description of the ozone generator 2 may also be modified to explain similar structures, and further descriptions thereof will not be made.

The ozone generator 2 preferably produces ozone in the amount of 3 grams per hour at 600 Hz, the fixed frequency of the inverter.

The water evaporator 3 may include a vibrator in the form of an electrically operable ultrasonic transducer. The water is made to vibrate by a high-frequency vibrator which causes the water to be atomized. An air stream directed onto the water carries the water vapor into the muffler 6. The water evaporator 3 preferably produces water vapor which has the ratio of condensate water: water vapor=4:1.

The muffler 6 has an inlet and outlet for the exhaust gas stream. A passageway is provided for conducting water vapor produced from the water evaporator 3 into the muffler 6 such that the exhaust gas stream passes through the water vapor prior to exhausting from the outlet of the muffler.

Figure 2:
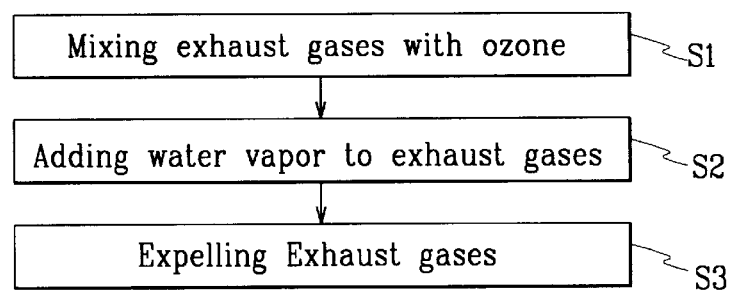
FIG. 2 is a block diagram illustrating the method of the present invention.

Referring now to FIG. 2, the method of the present invention is illustrated.

The exhaust gas stream, which is already treated by the catalytic converter 4 at a temperature of 300–400° C., enters the ozone contactor 5. In the ozone contactor 5, the exhaust gases are mixed with ozone produced by the ozone generator 2 (Step S1). In this step S1, pollutants comprising unburnt hydrocarbons (HC), $NO_x$, and $SO_x$ react with ozone and oxidize into $CO_2$, $NO_3-$, and $SO_3^{2-}$, respectively. Carbon monoxide (CO) may also oxidize into $CO_2$.

Next, the gas stream passes through the muffler 6 in which water vapor is introduced (Step S2). At least one pollutant in the gas reacts with the water vapor to reduce the pollutants. Specifically, $NO_{3-}$ and $SO_3^{2-}$ react with the water and turn into $HNO_3$ and $H_2SO_4$, respectively. Because $HNO_3$ and $H_2SO_4$ are in liquid phase, they are easy to separate from the gas. Accordingly so that the resultant exhaust gas expelled by the muffler 6 is primarily $CO_2$, and the other pollutants are reduced (Step S3).

Table 1 compares the results obtained with and without the apparatus according to the present invention.

TABLE 1

| | Reference criteria | Without the present invention | With the present invention |
|---|---|---|---|
| CO | 4.5% | 7.4% | 0 |
| HC | Below 220 ppm | 310 ppm | 17 ppm |
| $NO_X$ | 35% | 47% | Below 6% |
| $SO_X$ | 35% | 45% | Below 6% |

As shown in Table 1, pollutants comprising CO and HC to $CO_2$ and $SO_2$ are remarkably reduced.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. A method for treating exhaust gas produced from the combustion of fuels, comprising:

introducing ozone into the exhaust gas in an ozone contactor which is located downstream of a catalytic converter;

passing the exhaust gas through a muffler having an inlet and an outlet;

introducing water vapor into the exhaust gas prior to the outlet of the muffler; and passing the exhaust gas through at least a portion of a muffler, thereby reducing at least one pollutant, selected from a group consisting of unburnt hydrocarbons, carbon monoxide and oxides of nitrogen, from a first concentration to a second lower concentration.

2. The method of claim 1, further comprising the step of:

producing ozone in the amount of 3 grams per hour at a fixed frequency of 600 Hz in a corona discharge type ozone generator.

3. The method of claim 2, wherein the ozone is generated from air which passes through an air filter.

4. The method of claim 1, further comprising the step of:

producing water vapor with a water evaporator which has the ratio of condensate water:water vapor=4:1.

5. An apparatus for treating exhaust gases produced from the combustion of fuels, comprising:

an ozone contactor located downstream from a catalytic converter, for mixing the exhaust gas with ozone;

a muffler having an inlet and an outlet;

a water evaporator for adding water vapor to the exhaust gas; and a passageway for conducting water vapor into the muffler such that the exhaust gas stream passes through water vapor prior to exhausting from the outlet of the muffler.

6. The apparatus of claim 5, further comprising an ozone generator for producing ozone from air which passes through an air filter.

7. The apparatus of claim 5, wherein the ozone generator is a corona discharge type.

8. The apparatus of claim 7, wherein the ozone is produced in an amount of 3 grams per hour at a fixed frequency of 600 Hz.

9. The apparatus of claim 5, wherein the water evaporator produces water vapor which has a ratio of condensate water:water vapor=4:1.

* * * * *